United States Patent
Sakai et al.

(10) Patent No.: US 9,426,270 B2
(45) Date of Patent: Aug. 23, 2016

(54) CONTROL APPARATUS AND CONTROL METHOD TO CONTROL VOLUME OF SOUND

(75) Inventors: Yusuke Sakai, Kanagawa (JP); Masao Kondo, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/233,184

(22) Filed: Sep. 15, 2011

(65) Prior Publication Data

US 2012/0078619 A1 Mar. 29, 2012

(30) Foreign Application Priority Data

Sep. 29, 2010 (JP) ................. P2010-219866

(51) Int. Cl.
| | | |
|---|---|---|
| G10L 15/00 | (2013.01) | |
| G10L 15/20 | (2006.01) | |
| G06F 15/173 | (2006.01) | |
| G06F 15/16 | (2006.01) | |
| H04M 1/60 | (2006.01) | |
| H04M 1/57 | (2006.01) | |
| H04M 1/725 | (2006.01) | |
| G06F 3/16 | (2006.01) | |

(52) U.S. Cl.
CPC ............ *H04M 1/6016* (2013.01); *G06F 3/165* (2013.01); *H04M 1/57* (2013.01); *H04M 1/72558* (2013.01); *H04M 2250/12* (2013.01)

(58) Field of Classification Search
CPC ......... G10L 19/14; G10L 15/20; G10L 15/00; G06F 3/165; G06F 15/173; G06F 15/16; H04M 1/72558; H04M 2250/12
USPC ......... 704/225, 231, 270, 275, 226, 246, 272, 704/233; 381/55, 107
See application file for complete search history.

(56) References Cited

U.S. PATENT DOCUMENTS 5,592,385 A * 1/1997 Katayama .............. B60K 31/00
701/300
5,910,996 A * 6/1999 Eggers ..................... H04R 5/04
381/107

(Continued)

FOREIGN PATENT DOCUMENTS

| CN | 101779442 A | 7/2010 |
|---|---|---|
| DE | 0000408 | 4/2000 |

(Continued)

OTHER PUBLICATIONS

WebEx Tutorial, Cisco WebEx Meeting Center, Getting Started Guide, 2010, Cisco System. Inc., p. 1-2.*

(Continued)

*Primary Examiner* — Pierre-Louis Desir
*Assistant Examiner* — Seong Ah A Shin
(74) *Attorney, Agent, or Firm* — Lerner, David, Littenberg, Krumholz & Mentlik, LLP

(57) ABSTRACT

An apparatus may include a control unit to selectively control volume of content sound and volume of speech sound according to a priority assigned to a user corresponding to speech sound and a priority assigned to content data. When volume control is to be performed on a priority basis, the control unit may selectively control the volume of the content sound and the volume of the speech sound based on the assigned priorities so that the volume of the sound having a higher priority becomes louder than the volume of the other sound.

5 Claims, 7 Drawing Sheets

(56) References Cited

U.S. PATENT DOCUMENTS

| | | | | |
|---|---|---|---|---|
| 7,043,433 B2* | 5/2006 | Hejna, Jr. | G09B 5/00 | 704/211 |
| 7,272,232 B1* | 9/2007 | Donaldson | H04M 1/6016 | 381/119 |
| 7,379,876 B2* | 5/2008 | Nakata | G06F 3/04812 | 701/36 |
| 7,729,478 B1* | 6/2010 | Coughlan | H04M 3/53333 | 379/88.04 |
| 7,843,486 B1* | 11/2010 | Blair | H04M 3/568 | 348/14.01 |
| 8,290,134 B2* | 10/2012 | Jaiswal et al. | 379/202.01 | |
| 8,395,651 B2* | 3/2013 | DeGrazia et al. | 348/14.02 | |
| 8,438,034 B2* | 5/2013 | Jin | G06F 17/30032 | 348/231.4 |
| 8,452,027 B2* | 5/2013 | Katsuno | H04R 27/00 | 381/122 |
| 8,589,487 B1* | 11/2013 | Reeves | H04M 3/567 | 709/203 |
| 2004/0172257 A1* | 9/2004 | Liqin | G10L 13/00 | 704/277 |
| 2005/0102135 A1* | 5/2005 | Goronzy | G10L 15/00 | 704/213 |
| 2006/0053007 A1* | 3/2006 | Niemisto | G10L 25/78 | 704/233 |
| 2007/0218878 A1* | 9/2007 | Khawand | H04M 1/6016 | 455/414.1 |
| 2008/0001780 A1* | 1/2008 | Ohno | G08G 1/0962 | 340/904 |
| 2008/0160977 A1* | 7/2008 | Ahmaniemi | H04L 12/1822 | 455/416 |
| 2008/0202323 A1* | 8/2008 | Isozaki | G10H 1/0008 | 84/636 |
| 2008/0250110 A1* | 10/2008 | Zhao | 709/206 | |
| 2009/0210227 A1* | 8/2009 | Sugiyama | G10L 15/22 | 704/246 |
| 2009/0240496 A1* | 9/2009 | Yamamoto | G10L 15/20 | 704/233 |
| 2009/0316932 A1* | 12/2009 | Campion | H04M 1/6016 | 381/107 |
| 2010/0118112 A1* | 5/2010 | Nimri | H04N 7/147 | 348/14.08 |
| 2011/0161076 A1* | 6/2011 | Davis | G06F 3/04842 | 704/231 |
| 2011/0255712 A1* | 10/2011 | Urata | H03G 9/005 | 381/107 |
| 2011/0271208 A1* | 11/2011 | Jones | H04L 12/1822 | 715/753 |
| 2011/0313762 A1* | 12/2011 | Ben-David | G10L 13/08 | 704/231 |
| 2012/0020487 A1* | 1/2012 | Fried | H03G 3/301 | 381/58 |
| 2012/0030357 A1* | 2/2012 | Linsky | H04W 72/1215 | 709/226 |
| 2012/0226997 A1* | 9/2012 | Pang | H04L 65/4038 | 715/753 |
| 2012/0262533 A1* | 10/2012 | Gannu et al. | 348/14.07 | |
| 2013/0150163 A1* | 6/2013 | Radek | G07F 17/3234 | 463/35 |
| 2014/0335823 A1* | 11/2014 | Heredia | H04L 12/5895 | 455/411 |

FOREIGN PATENT DOCUMENTS

| | | |
|---|---|---|
| GB | 2433380 A | 6/2007 |
| JP | 11-045096 A | 2/1999 |
| JP | 2004146894 A | 5/2004 |
| JP | 2005057525 A | 3/2005 |
| JP | 2005071050 A | 3/2005 |
| JP | 2006295552 A | 10/2006 |
| JP | 2007074381 A | 3/2007 |
| JP | 2007300452 A | 11/2007 |
| JP | 2009004959 A | 1/2009 |
| JP | 2009159367 A | 7/2009 |
| JP | 2010103721 A | 5/2010 |

OTHER PUBLICATIONS

WebEx, Jul. 23. 2010, WebEx Meeting Center User Guide for Hosts, Presenters, and Participants , Cisco Inc.*
Office Action from Japanese Application No. 2010-219866, dated Feb. 18, 2014.
Partial European Search Report EP 11181378, dated Feb. 2, 2012.
CN Office Action for Chinese Application No. 201110282325.X, dated Dec. 3, 2014.
Japanese Office Action for JP Application No. 2014164766, dated May 26, 2015.
Office Action for Japanese Application No. 2014164766 Dated Jan. 12, 2016.

* cited by examiner

CONTROL APPARATUS AND CONTROL METHOD TO CONTROL VOLUME OF SOUND

CROSS-REFERENCE TO RELATED APPLICATIONS

This application claims priority from Japanese Patent Application No. 2010-219866 filed in the Japan Patent Office on Sep. 29, 2010, the entire contents of which is hereby incorporated by reference.

BACKGROUND

The present disclosure relates to a control apparatus and a control method.

In recent years, apparatuses, such as personal computers (PCs), that allow caller-callee communication with an external apparatus between users while reproducing content data have been in widespread use. Among such apparatuses, some apparatuses allow a user to independently control the sound volume of content data and the sound volume of speech of the user by, for example, using a sound mixing function of an application regarding reproduction of content data and an application regarding voice communication. However, it is necessary for a user of such an apparatus to manually control the volume in accordance with, for example, communication conditions as necessary. Therefore, users who use such apparatuses experience inconvenience.

Accordingly, a technology for automatically controlling sound volume has been developed. For example, in order to output, while one type of sound is being output, sound corresponding to another type of sound data, Japanese Unexamined Patent Application Publication No. 11-45096 describes a technology for decreasing the volume of the one type of sound.

When outputting, while one type of sound is being output, sound corresponding to another type of sound data, a control apparatus that employs an existing technology for automatically controlling the volume (hereinafter referred to as an "existing control apparatus") decreases the volume of the one type of sound. That is, if, for example, an existing control apparatus performs caller-callee communication with an external apparatus between users while reproducing content data, an existing control apparatus automatically decreases the volume of sound of reproduced content data (hereinafter referred to as "content sound") every time speech of the user is output. Therefore, when an existing technology is used, it is not necessary for a user to manually control the volume of content sound and the volume of speech as necessary. As a result, the user can experience some level of convenience.

However, as described above, if, while one type of sound is being output, sound corresponding to another type of sound data is output, an existing apparatus decreases the volume of the one type of sound. Therefore, in an existing apparatus, even when the user does not want to decrease the volume of, for example, content sound, the volume is disadvantageously decreased automatically.

Thus, even when an existing technology is employed, it is very difficult to increase the convenience that the user experiences.

SUMMARY

Accordingly, the present disclosure provides novel and improved control apparatus and control method capable of improving the convenience of a user when the control apparatus performs caller-callee communication with a communication target apparatus.

In accordance with one aspect of the embodiments, an apparatus may include a control unit to selectively control volume of content sound and volume of speech sound according to a priority assigned to a user corresponding to speech sound and a priority assigned to content data. In addition, when volume control is to be performed on a priority basis, the control unit may selectively control the volume of the content sound and the volume of the speech sound based on the assigned priorities so that the volume of the sound having a higher priority becomes louder than the volume of the other sound.

In accordance with another aspect of the embodiments, a method may include selectively controlling, by a processor, volume of content sound and volume of speech sound according to a priority assigned to a user corresponding to speech sound and a priority assigned to content data. The method may further include that, when volume control is to be performed on a priority basis, the volume of the content sound and the volume of the speech sound are selectively controlled based on the assigned priorities so that the volume of the sound having a higher priority becomes louder than the volume of the other sound.

In accordance with another aspect of the embodiments, a non-transitory recording medium may be recorded with a computer-readable program having instructions executable by a processor. The program may include selectively controlling volume of content sound and volume of speech sound according to a priority assigned to a user corresponding to speech sound and a priority assigned to content data. The program may further include that, when volume control is to be performed on a priority basis, the volume of the content sound and the volume of the speech sound are selectively controlled based on the assigned priorities so that the volume of the sound having a higher priority becomes louder than the volume of the other sound.

According to the present disclosure, the convenience of a user can be improved when the control apparatus performs caller-callee communication with a communication target apparatus.

DETAILED DESCRIPTION OF EMBODIMENTS

Figure 1:
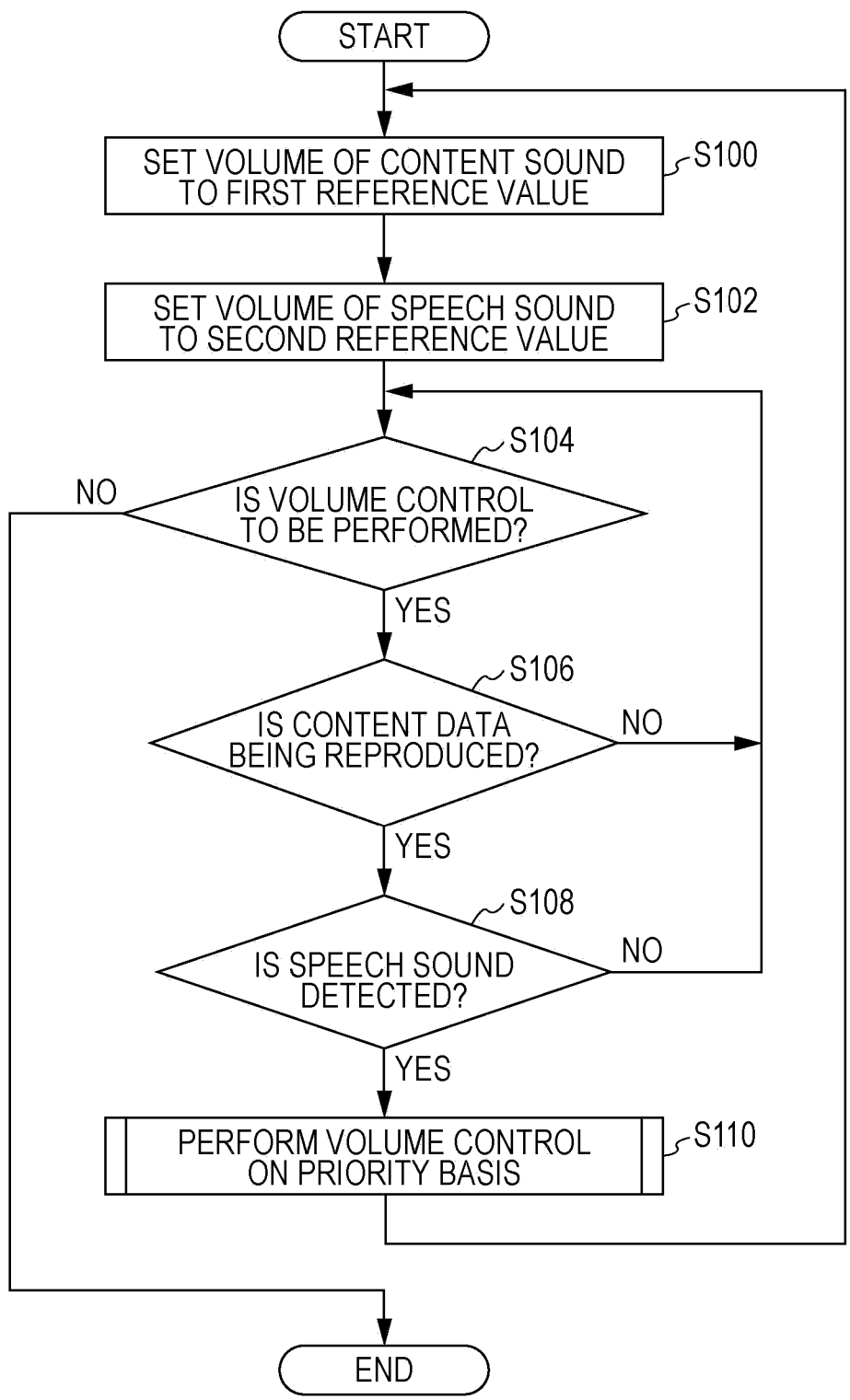
FIG. 1 is a flowchart of an example of a process according to a convenience improvement approach performed by a control apparatus according to an embodiment of the present disclosure.

Exemplary embodiments of the present disclosure are described in detail below with reference to the accompanying drawings. Note that as used herein, the same numbering will be used in describing components having substantially the same functional structure and, thus, descriptions thereof are not repeated.

In addition, the descriptions are made in the following order:
1. Technical Approach According to Embodiment of Present Disclosure
2. Control Apparatus According to Embodiment of Present Disclosure
3. Program According to Embodiment of Present Disclosure 1. Technical Approach According to Embodiment of Present Disclosure Before describing an exemplary configuration of a control apparatus according to an embodiment of the present disclosure (hereinafter also referred to as a "control apparatus 100"), a convenience improvement approach according to the embodiment of the present disclosure is described. Note that a process in accordance with the convenience improvement approach according to the embodiment of the present disclosure described below can be regarded as a process in accordance with a control method according to the embodiment of the present disclosure.

In addition, the following description is made with reference to the case in which, for example, the control apparatus 100 performs a process for reproducing content data and caller-callee communication with at least one communication target apparatus at the same time. As used herein, the term "content data according to an embodiment of the present disclosure" refers to sound data or sound and image (still image/moving image) data. Examples of content data include music data and video data. In addition, an example of caller-callee communication according to an embodiment of the present disclosure is communication through voice call. However, caller-callee communication according to an embodiment of the present disclosure is not limited thereto. For example, caller-callee communication according to an embodiment of the present disclosure may be caller-callee communication using a captured image, which is a moving image obtained by image capturing, and voice (e.g., video call). Note that a captured image according to an embodiment of the present disclosure is, for example, a moving image obtained by image capturing (or a set of still images continuously captured in the time axis direction).

Brief Overview of Convenience Improvement Approach

As described above, if, while outputting one type of sound, an existing apparatus outputs sound corresponding to another type of sound data, the existing apparatus decreases the volume of the one type of sound. However, in the case in which an existing apparatus has a function of performing caller-callee communication with an external apparatus between users while reproducing content data, the existing apparatus may automatically decrease the volume of content sound although the user does not want to decrease the volume of the content sound. For example, a user does not want the volume of content sound to automatically decrease when a climactic scene of a movie (an example of a content item) is reproduced. In such an undesirable case, decreasing the volume automatically may impair user convenience. Accordingly, even when an existing control apparatus is used, user convenience is not necessarily increased.

In contrast, even when a climactic scene of a movie (an example of a content item) is reproduced, a user may want the volume of content sound to automatically decrease. For example, a user sets the volume of content sound to automatically decrease if the user wants to put a priority on voice communication over the reproduced content. In such a case, as in the existing technology, when one type of sound is being output and if sound corresponding to another type of sound data is output, the volume of the one type of sound is decreased. In this way, the convenience of the user can be increased.

Therefore, according to an embodiment of the present disclosure, a control apparatus 100 selectively controls the volume of content sound and the volume of speech sound on the basis of a priority assigned to a user corresponding to the detected speech sound. More specifically, the control apparatus 100 selectively controls the volume of content sound and the volume of speech sound so that the volume of sound having a higher priority becomes louder.

As used herein, the term "priority according to an embodiment of the present disclosure" refers to an index used by the control apparatus 100 to determine which one of the volumes of content sound and speech sound is preferentially increased when the volumes of content sound and speech sound are controlled. For example, if a priority is assigned to one of content data and a user corresponding to speech sound, the control apparatus 100 determines that the one having the priority assigned thereto has a higher priority. In contrast, if priorities are assigned to both, the control apparatus 100 determines that the one having a higher priority has a higher priority. An example of the priority is a "step-wise" value, such as a value from 1 to 10. Note that the priority according to an embodiment of the present disclosure is not limited to the step-wise value. For example, any format that allows such determination can be employed. In addition, when the priority according to the embodiment of the present disclosure is expressed using a step-wise value, the larger value may represent a higher priority, for example. However, the smaller value may represent a higher priority. The following description is made with reference to the case in which the priority according to an embodiment of the present disclosure is expressed using a step-wise value, and the larger value represents a higher priority.

For example, content data includes a priority in the form of meta data. In the above-described case, the control apparatus 100 references the meta data of content data being reproduced as necessary. Thus, the control apparatus 100 can dynamically analyze the priority of content data, for example, on a per scene basis (when the content data represents video data) or on a per phrase basis (when the content data represents music data). At that time, for example, a priority assigned to content data is preset by the creator of the content data. However, the setter is not limited to a creator. For example, the control apparatus 100 may set the priority in accordance with, for example, a user operation. In addition, the above-described meta data may be included in, for example, content data or may be separated from content data (i.e., external meta data).

In addition, for example, the control apparatus 100 identifies a priority assigned to a user corresponding to speech sound on the basis of priority information stored in the control apparatus 100 or priority information sent from a communication target apparatus. As used herein, the term "priority information according to an embodiment of the present disclosure" refers to information including a user name and a priority associated with the user name. For example, a priority included in the priority information is set when the priority information is generated. However, the setting of the priority is not limited thereto. For example, the control apparatus 100 may set the priority in accordance with, for example, a user operation.

Furthermore, if a plurality of priority information items are present for the same user (e.g., priority information stored in the control apparatus 100 and priority information sent from a communication target apparatus), the control apparatus 100, for example, selectively use one of the priority information items. In the above-described case, the control apparatus 100 selects one of the priority information items to be used on the basis of predetermined setting or setting set through a user operation (for example, the control apparatus 100 preferentially selects the priority information stored in the control apparatus 100). Note that the process performed by the control apparatus 100 when a plurality of priority information items are present for the same user is not limited to the above-described process. For example, the control apparatus 100 can compute the average value of the priorities set in the plurality of priority information items for the same user and uses the average value as a new priority.

In the control apparatus 100, a technique for identifying the priority assigned to a user corresponding to speech sound is not limited to the above-described technique. For example, the control apparatus 100 can identify a priority assigned to a user corresponding to the speech sound on the basis of priority information and user information that is stored in the control apparatus 100 and that includes a user name and user identification information associated with the user name. More specifically, the control apparatus 100 identifies the user who gave speech on the basis of the user information and acquires the priority assigned to the identified user from the priority information. According to the embodiment of the present disclosure, examples of the information used for identifying a user and recorded in the user information include vocal print information regarding the user (the frequency and strength of the voice) and face information indicating the feature of the face of the user (e.g., skeletal information and information indicating a positional relationship among the eyes, nose, and mouth). For example, the control apparatus 100 compares the speech sound with the recorded user voice print information or compares face information extracted from a captured image with the recorded face information. By using any voice print authentication technique or face recognition technique, a user who gave speech can be identified.

As described above, by selectively controlling the volume of the content sound and the volume of speech sound in accordance with the set priority, the control apparatus 100 can increase the volume of the sound having a higher priority assigned thereto more than the volume of the other sound. Accordingly, by dynamically controlling the volume in accordance with the set priority, the control apparatus 100 can increase the volume of content sound more than the volume of speech sound or increase the volume of speech sound more than the volume of content sound.

Thus, the control apparatus 100 can control the volume of sound while reducing the probability of the occurrence of an undesirable situation and, therefore, user convenience can be increased.

While above description has been made with reference to an example in which the control apparatus 100 controls the volume of sound on a priority basis, the process performed by the control apparatus 100 according to an embodiment of the present disclosure is not limited thereto. For example, when the control apparatus 100 communicates with a communication target apparatus in caller-callee communication using a captured image and voice (e.g., a video call), the control apparatus 100 can further update the display ratio of an image of reproduced content data to a captured image in the caller-callee communication. According to the embodiment of the present disclosure, as an example of updating the display ratio in conjunction with selective control of the volume of sound, when the control apparatus 100 increases the speech sound of a communication partner user who speaks using the communication target apparatus, the control apparatus 100 also increases the display size of a captured image of the communication partner user. In contrast, for example, the control apparatus 100 may decrease the display size of the image of content data in conjunction with updating of the above-described captured image. It should be noted that according to the embodiment of the present disclosure, the process for updating the display size in conjunction with updating of selective control of the volume of sound is not limited to the above-described example.

Since the control apparatus 100 changes the display ratio in conjunction with the above-described selective volume control, the user of the control apparatus 100 can visually recognize which user of a communication target apparatus has the speech sound having a louder volume. Thus, by changing the display ratio in conjunction with the above-described selective volume control, the control apparatus 100 can further increase user convenience.

In addition, if priorities are not assigned to the content data and the user corresponding to the speech sound, the control apparatus 100 determines that, for example, the user corresponding to the speech sound has a priority higher than that assigned to the content data (an example of an exceptional process). Thereafter, the control apparatus 100 selectively controls the volume of the content sound and the volume of the speech sound. Therefore, even when priorities are not assigned to the content data and the user corresponding to the speech sound, the control apparatus 100 can increase the volume of the speech more than the volume of the content sound on the basis of the result of a predetermined determination. Note that while the above description has been made with reference to the case in which if priorities are not assigned to the content data and the user corresponding to the speech sound, the speech sound has a priority, the control apparatus 100 may control the volumes so that the content sound has a priority. By controlling the volume of the content sound and the volume of the speech sound on the basis of the result of predetermined determination, the control apparatus 100 can automatically control the volumes even when priorities are not assigned to the content data and the user corresponding to the speech sound.

Specific Example of Process According to Convenience Improvement Approach

A specific example of a process to realize the convenience improvement approach according to the embodiment of the present disclosure is described next. FIG. 1 is a flowchart illustrating an example of a process according to the convenience improvement approach performed by the control apparatus 100 according to the embodiment of the present disclosure.

The control apparatus 100 sets the volume of content sound to a first reference value (step S100) and sets the volume of speech sound to a second reference value (step S102).

As used herein, the term "first reference value" according to an embodiment of the present disclosure refers to a value serving as a reference of the volume of content sound. In addition, the term "second reference value" according to an embodiment of the present disclosure refers to a value serving as a reference of the volume of speech sound. That is, the processes performed in steps S100 and S102 correspond to processes for setting the initial values of the volumes of content sound and speech sound.

In addition, FIG. 1 illustrates an example in which the process in step S102 is performed after the process in step S100 has been performed. However, the process according to the convenience improvement approach is not limited thereto. For example, the control apparatus 100 may perform the process in step S100 after the process in step S102 has been performed. Alternatively, the control apparatus 100 may simultaneously perform the processes in steps S100 and S102.

When the processes in steps S100 and S102 are performed, the control apparatus 100 determines whether the volume control according to the convenience improvement approach according to an embodiment of the present disclosure is performed (step S104). At that time, the control apparatus 100 makes determination in step S104 on the basis of, for example, the state of a hardware switch that determines on/off of volume control or a software switch that determines on/off of volume control on the basis of an external operation signal transmitted from an external operation device, such as a remote controller. However, the process performed by the control apparatus 100 according to an embodiment of the present disclosure in step S104 is not limited thereto.

For example, the control apparatus 100 may detect a predetermined motion performed by the user and determine whether volume control is performed on the basis of the result of detection. In such a case, for example, the control apparatus 100 performs image processing on a captured image generated by an imaging device (an imaging unit described below) included in the control apparatus 100 or an external imaging device (an imaging apparatus described below) and detects a predetermined motion performed by the user in the captured image (e.g., the shape of the hand indicating on/off of volume control or a periodic motion). Thereafter, for example, the control apparatus 100 determines that volume control is to be performed if an ON operation for volume control is detected. At that time, if an ON operation for volume control is detected, the control apparatus 100 determines that volume control continues until, for example, an OFF operation for volume control is detected. However, the process performed by the control apparatus 100 is not limited thereto. For example, the control apparatus 100 may determine that volume control is performed only when an ON operation for volume control is detected.

In addition, the control apparatus 100 can determine whether volume control is performed on the basis of distance information generated by a sound input device (a sound input unit described below) included in the control apparatus 100 or an external sound input device (a sound input apparatus described below). The distance information indicates the distance between the sound input device or the external sound input device and the user. For example, if a distance indicated by the distance information is smaller than or equal to a predetermined threshold value (or smaller than the predetermined threshold value), the control apparatus 100 can determine that volume control is performed. In this case, for example, the control apparatus 100 determines that volume control is performed until the distance indicated by the distance information is larger than a predetermined threshold value (or larger than or equal to the predetermined threshold value). Note that the above-described distance information is generated by a distance sensor included in, for example, a sound input device or an external sound input device. However, the distance sensor is not necessarily included in a sound input device or an external sound input device, but may be an independent device. In such a case, a distance information generating unit (not shown) or a distance measuring unit (not shown) having a body separated from a sound input unit or a sound input unit (described below) generates the distance information. In addition, in this case, the distance information indicates a coarse distance between the sound input device (the sound input unit described below) included in the control apparatus 100 or the external sound input device (the sound input apparatus described below) and the user.

If, in step S104, it is determined that volume control is not performed, the control apparatus 100 completes the process according to the convenience improvement approach. Note that the process according to the convenience improvement approach shown in FIG. 1 is not a process that is limited to being performed once, but the process according to the convenience improvement approach shown in FIG. 1 can be periodically or non-periodically performed again by the control apparatus 100 even after the process has been completed once.

However, if, in step S104, it is determined that volume control is to be performed, the control apparatus 100 determines whether content data is being reproduced (step S106). For example, if content data stored in a storage unit (described below) is being reproduced or content data transmitted from an external apparatus, such as a communication target apparatus or a server, is being reproduced, the control apparatus 100 determines that content data is being reproduced. At that time, for example, the control apparatus 100 can reproduce streaming content data or download content data transmitted from an external apparatus.

If, in step S106, it is determined that content data is not being reproduced, the control apparatus 100 repeats the processing from step S104.

However, if, in step S106, it is determined that content data is being reproduced, the control apparatus 100 determines whether speech sound is detected (step S108). At that time, when, for example, the control apparatus 100 includes a sound input device (the sound input unit described below) and if a sound signal generated by the sound input device is detected, or when an external sound signal received from a communication target apparatus is detected, the control apparatus 100 determines that speech sound is detected. However, when, for example, the control apparatus 100 does not include such a sound input device and if a sound signal generated by an external sound input device (the sound input apparatus described below) or an external sound signal received from a communication target apparatus is detected, the control apparatus 100 determines that speech sound is detected.

If, in step S108, it is determined that speech sound is not detected, the control apparatus 100 repeats the processing from step S104.

However, if, in step S108, it is determined that speech sound is detected, the control apparatus 100 performs volume control on a priority basis (step S110).

Example of Volume Control Process on Priority Basis

Figure 2:
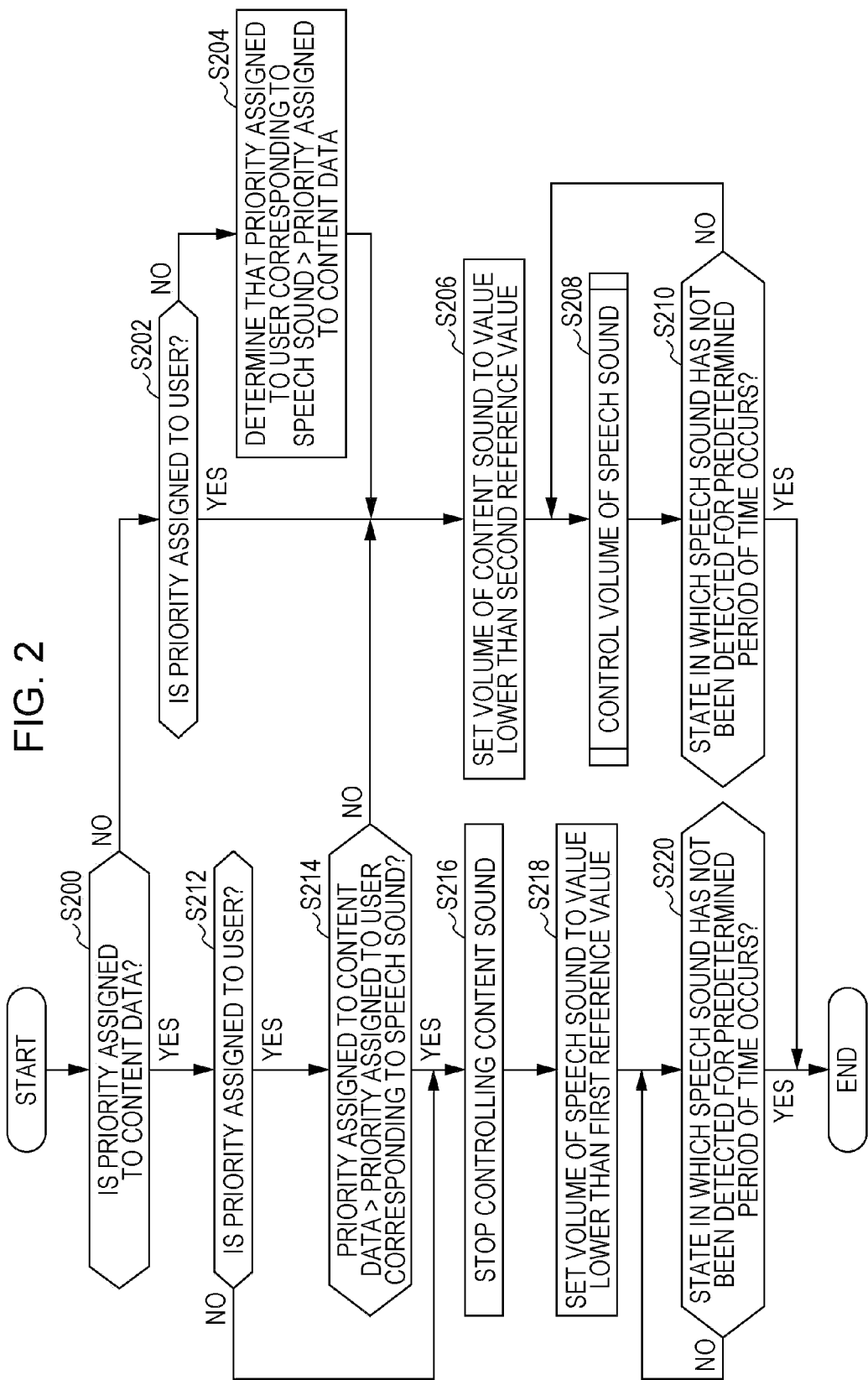
FIG. 2 is a flowchart of an example of a priority-based volume control process performed by the control apparatus according to the embodiment of the present disclosure.

FIG. 2 is a flowchart of an example of a volume control process performed on a priority basis by the control apparatus 100 according to an embodiment of the present disclosure. That is, FIG. 2 illustrates an example of a process performed in step S110 shown in FIG. 1.

The control apparatus 100 determines whether a priority has been assigned to content data being reproduced (step S200). The control apparatus 100 makes determination in step S200 using the meta data of the content data.

(1) Case in which Priority is not Assigned to Content Data

If, in step S200, it is determined that a priority has not been assigned to the content data being reproduced, the control apparatus 100 determines whether a priority has been assigned to a user corresponding to the speech sound (step S202). At that time, for example, the control apparatus 100 performs the process in step S202 by identifying the priority assigned to the user corresponding to speech sound in caller-callee communication on the basis of priority information stored in the control apparatus 100 or priority information sent from the communication target apparatus.

If, in step S202, it is determined that a priority is assigned to the user corresponding to the speech sound, the control apparatus 100 performs the processes performed in steps S206 and S208 described below.

However, if, in step S202, it is determined that a priority is not assigned to the user corresponding to the speech sound, the control apparatus 100 determines that a priority that is higher than that for the content data being reproduced is assigned to the user corresponding to the speech sound (step S204). Here, the process performed in step S204 is a sort of an exceptional process in a priority basis volume control process.

When, in step S202, it is determined that a priority is assigned to the user corresponding to the speech sound or when the process in step S204 is performed, the control apparatus 100 sets the volume of the content sound to a value lower than the second reference value (step S206). In addition, the control apparatus 100 controls the volume of the speech sound (step S208).

Note that in FIG. 2, the case in which the process in step S208 is performed after the process in step S206 has been performed is illustrated. However, the volume control process performed by the control apparatus 100 is not limited thereto. For example, the control apparatus 100 may perform the process in step S206 after the process in step S208 has been performed. Alternatively, the control apparatus 100 can simultaneously perform the processes in steps S206 and S208.

Figure 3:
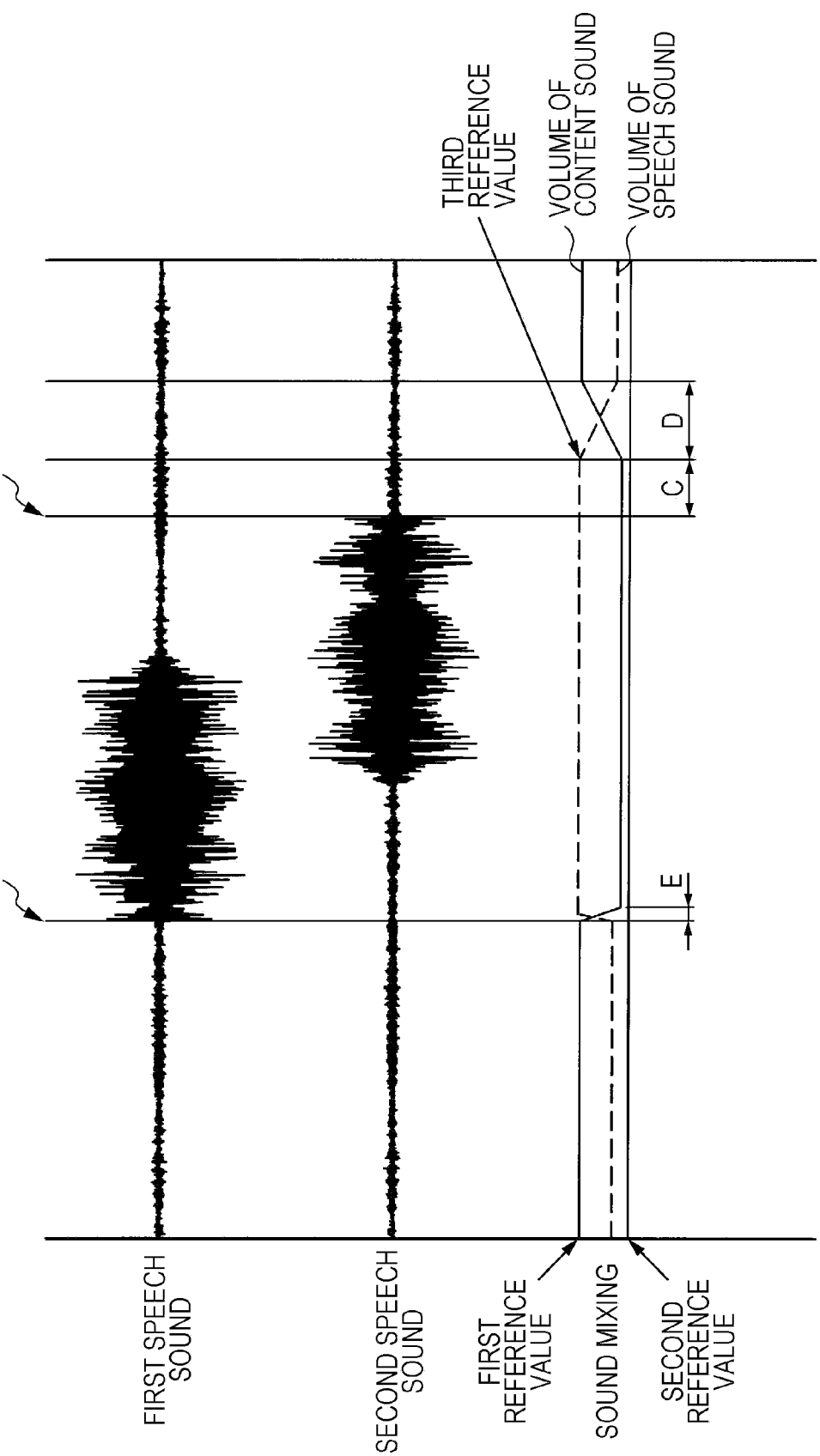
FIG. 3 illustrates an example of control of the volumes of content sound and speech sound performed by the control apparatus according to the embodiment of the present disclosure.

FIG. 3 illustrates an example of control of the volumes of content sound and speech sound performed by the control apparatus 100 according to an embodiment of the present disclosure.

In FIG. 3, speech sound corresponding to a sound signal generated by the sound input device (the sound input unit described below) or the external sound input device (the sound input apparatus described below) is referred to as "first speech sound", and speech sound corresponding to an external sound signal transmitted from a communication target apparatus (i.e., the speech of a communication partner) is referred to as "second speech sound". Note that hereinafter, the first speech sound and the second speech sound shown in FIG. 3 are collectively referred to as "speech sound". In addition, in FIG. 3, an example in which the number of the second speech sounds is one, that is, an example in which the control apparatus 100 communicates with only one communication target apparatus is shown. Furthermore, in FIG. 3, an example in which the second reference value is lower than the first reference value is shown. However, a relationship between the first reference value and the second reference value according to an embodiment of the present disclosure is not limited thereto. For example, according to the embodiment of the present disclosure, the second reference value may be higher than the first reference value.

As indicated by "A" shown in FIG. 3, if a first speech sound or a second speech sound is detected, the control apparatus 100 controls the volume of the content sound and the volume of the speech sound. More specifically, for example, the control apparatus 100 sets the volume of the content sound to a value lower than the second reference value. In addition, for example, the control apparatus 100 sets the volume of the speech sound to a third reference value that is higher than the second reference value. As used herein, the term "third reference value" refers to a maximum value of the volume of speech sound set by the control apparatus 100 in the volume control process according to the embodiment of the present disclosure. In addition, for example, the third reference value may be a predetermined value or a value changeable through a user operation.

While FIG. 3 illustrates an example in which the volume of the content sound and the volume of the speech sound are controlled, the volume control process performed by the control apparatus 100 according to the embodiment of the present disclosure is not limited thereto. For example, the control apparatus 100 can selectively control the volume of the content sound and the volume of the speech sound. For example, the control apparatus 100 may set the volume of the content sound to a value lower than the second reference value without controlling the volume of the speech sound. Alternatively, the control apparatus 100 may set the volume of the speech sound to the third reference value without controlling the volume of the content sound (in the case in which the first reference value<the third reference value). That is, the control apparatus 100 can selectively control the volume of the content sound and the volume of the speech sound so that the sound having a higher priority is increased more.

As indicated by "B" shown in FIG. 3, if the first speech sound and the second speech sound are not detected, the control apparatus 100 determines whether the state in which speech sound is not detected continues for a predetermined period of time (a period of time indicated by "C" shown in FIG. 3). If the control apparatus 100 determines that speech sound has not been detected for the predetermined period of time (the period of time indicated by "C" shown in FIG. 3), the control apparatus 100 sets the volume of the content sound to the first reference value and sets the volume of the speech sound to the second reference value. Thus, the control apparatus 100 controls the volume of the content sound and the volume of the speech sound again. The reason why the control apparatus 100 controls the volume of the content sound and the volume of the speech sound again when the control apparatus 100 determines that the state in which speech sound is not detected continues for the predetermined period of time (the period of time indicated by "C" shown in FIG. 3) is that in the case of caller-callee communication, there is a possibility of, after speech sound disappears, a subsequent speech sound being immediately detected. Thus, by setting a predetermined period of time for detection, frequent changes in the volumes of content sound and speech sound caused by frequent volume control operations can be prevented.

In addition, when the control apparatus 100 markedly increases the volume of the content sound and the volume of the speech sound, the control apparatus 100 gradually increases the volumes for a predetermined period of time (e.g., the periods indicated by "D" and "E" shown in FIG. 3) (this operation is called "fade-in"). In addition, when the control apparatus 100 decreases the volume of the content sound and the volume of the speech sound, the control apparatus 100 gradually decreases the volumes for a predetermined period of time (e.g., the periods indicated by "D" and "E" shown in FIG. 3) (this operation is called "fade-out"). At that time, for example, as indicated by "D" shown in FIG. 3, a predetermined period of time necessary to control the volume of the content sound can be set so as to be the same as a predetermined period of time necessary to control the volume of the speech sound. Alternatively, for example, as indicated by "E" shown in FIG. 3, these predetermined periods of time can be set to different values.

For example, the control apparatus 100 controls the volume of the content sound and the volume of the speech sound in a manner shown in FIG. 3. Note that in FIG. 3, the volume of the first speech sound is controlled in synchronization with the volume of the second speech sound. However, a volume control process of the volume of the speech sound performed by the control apparatus 100 according to an embodiment of the present disclosure is not limited thereto. For example, if a plurality of speech sounds are detected, the control apparatus 100 can control the volume of the speech sound corresponding to a user having a higher priority.

Example of Volume Control Process of Speech Sound

Figure 4:
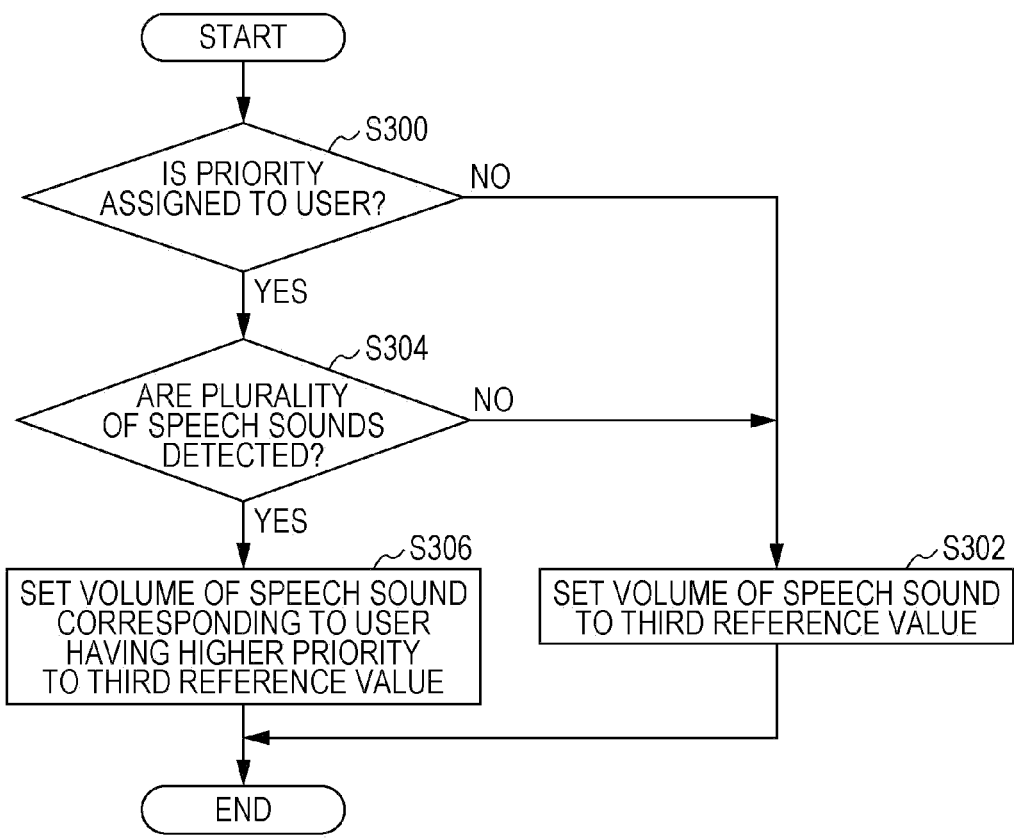
FIG. 4 is a flowchart of an example of a volume control process of speech sound performed by the control apparatus according to the embodiment of the present disclosure.

FIG. 4 is a flowchart of an example of a volume control process of speech sound performed by the control apparatus 100 according to the embodiment of the present disclosure. That is, FIG. 4 illustrates an example of a process performed in step S208 shown in FIG. 2.

As in step S202 shown in FIG. 2, the control apparatus 100 determines whether a priority is assigned to a user corresponding to the speech sound (step S300).

If, in step S300, it is determined that a priority is not assigned to the user corresponding to the speech sound, the control apparatus 100 sets the volume of the speech sound to the third reference value (step S302). Thereafter, the control apparatus 100 completes the sound control process of speech sound.

However, if, in step S300, it is determined that a priority is assigned to the user corresponding to the speech sound, the control apparatus 100 determines whether a plurality of speech sounds have been detected (step S304). If, in step S304, it is determined that a plurality of speech sounds have not been detected, the control apparatus 100 performs the process in step S302 and, thereafter, completes the volume control process of speech sound.

However, if, in step S304, it is determined that a plurality of speech sounds have been detected, the control apparatus 100 sets the volume of the speech sound corresponding to the user having a higher priority assigned thereto to the third reference value (step S306). Thereafter, the control apparatus 100 completes the volume control process of speech sound.

At that time, in step S306, the control apparatus 100 controls the volumes of the speech sound corresponding to one or more users having higher priorities and does not control the volumes of speech sounds corresponding to other users. However, the process performed in step S306 according to the embodiment of the present disclosure is not limited thereto. For example, the control apparatus 100 can control the volumes of speech sounds in accordance with the priorities assigned to corresponding users. For example, by using a lookup table including a priority and the volume associated with the priority, the control apparatus 100 sets the volumes in accordance with the priorities assigned to the users.

For example, the control apparatus 100 performs the process shown in FIG. 4. Thus, even when a plurality of speech sounds are present, the control apparatus 100 can control the volumes of the speech sounds in accordance with the priorities assigned to the corresponding users. It should be noted that the volume control process of speech sound according to an embodiment of the present disclosure is not limited to the process shown in FIG. 4.

Referring back to FIG. 2, an example of a volume control process performed on a priority basis by the control apparatus 100 according to an embodiment of the present disclosure is described next. After the process in step S208 is completed, the control apparatus 100 determines whether the state in which speech sound has not been detected for a predetermined period of time occurs (step S210). In this case, the predetermined period of time in step S210 corresponds to, for example, a period indicated by "C" shown in FIG. 3.

If, in step S210, it is determined that the state in which speech sound has not been detected for a predetermined period of time does not occur, the control apparatus 100 repeats the processes from step S208. However, if, in step S210, it is determined that the state in which speech sound has not been detected for a predetermined period of time occur, the control apparatus 100 completes the volume control process performed on a priority basis.

(2) Case in which Priority is Assigned to Content Data

An example of the volume control process performed on a priority basis when a priority is assigned to content data is described next. If, in step S200, it is determined that a priority is assigned to content data being reproduced, the control apparatus 100 determines whether a priority is assigned to the user corresponding to the speech sound, as in step S202 (step S212).

If, in step S212, it is determined that a priority is not assigned to the user corresponding to the speech sound, the control apparatus 100 performs the processes in steps S216 and S218 described below.

However, if, in step S212, it is determined that a priority is assigned to the user corresponding to the speech sound, the control apparatus 100 determines whether the priority assigned to the content data is higher than the priority assigned to the user corresponding to the speech sound (step S214).

If, in step S214, it is determined that the priority assigned to the content data is higher than the priority assigned to the user corresponding to the speech sound, the control apparatus 100 performs the processes subsequent to step S206.

However, if, in step S214, it is determined that the priority assigned to the content data is not higher than the priority assigned to the user corresponding to the speech sound, the control apparatus 100 does not control the volume of the content sound (step S216). In addition, the control apparatus 100 performs setting so that the volume of the speech sound is lower than the first reference value (step S218).

Note that FIG. 2 illustrates an example in which the control apparatus 100 does not control the volume of the content sound in step S216. However, according to the embodiment of the present disclosure, the process performed in step S216 is not limited thereto. For example, if it is determined that the priority assigned to the content data is not higher than the priority assigned to the user corresponding to the speech sound, the control apparatus 100 may set the volume of the content sound to a value higher than the first reference value. In addition, if the second reference value is lower than the first reference value, the control apparatus 100 sets the volume of the speech sound to a value lower than the second reference value in step S218.

Note that in FIG. 2, the case in which the process in step S218 is performed after the process in step S216 has been performed is illustrated. However, the volume control process performed by the control apparatus 100 is not limited thereto. For example, the control apparatus 100 may perform the process in step S216 after the process in step S218 has been performed. Alternatively, the control apparatus 100 can simultaneously perform the processes in steps S216 and S218.

After the process in step S218 is completed, the control apparatus 100 determines whether the state in which speech sound has not been detected for a predetermined period of time occurs, as in step S210 (step S220).

If, in step S220, it is determined that the state in which speech sound has not been detected for a predetermined period of time does not occur, the control apparatus 100 stops processing until it is determined that the speech sound has not been detected for a predetermined period of time. However, if, in step S220, it is determined that the state in which speech sound has not been detected for the predetermined period of time occur, the control apparatus 100 completes the volume control process performed on a priority basis.

By performing, for example, the process shown in FIG. 2, the control apparatus 100 performs the volume control process on the basis of a priority assigned to the content data and/or a priority assigned to the user corresponding to the speech sound. However, it should be noted that the volume control process performed on a priority basis according to the embodiment of the present disclosure is not limited to the example shown in FIG. 2.

Referring back to FIG. 1, an example of a process for realizing the convenience improvement approach according to the embodiment of the present disclosure is described next. After the process in step S110 (the volume control process performed on a priority basis) is completed, the control apparatus 100 repeats the processes from step S100.

The control apparatus 100 selectively control the volume of sound of content data being reproduced and the volume of the speech sound in caller-callee communication by performing, for example, the processes shown in FIG. 1. At that time, the control apparatus 100 selectively controls the volume of the content sound and the volume of the speech sound so that the volume of the sound having a higher priority becomes higher by performing, for example, the volume control process on a priority basis shown in FIG. 2. Accordingly, the control apparatus 100 can realize the convenience improvement approach according to the embodiment of the present disclosure by performing the process shown in FIG. 1. Thus, the convenience of a user can be increased when caller-callee communication is performed with a communication target apparatus. However, it should be noted that the process for realizing the convenience improvement approach according to an embodiment of the present disclosure is not limited to the process shown in FIG. 1.

2. Control Apparatus According to Embodiment of Present Disclosure

An example of the configuration of the control apparatus 100 according to the embodiment of the present disclosure that can perform the process associated with the convenience improvement approach according to the embodiment of the present disclosure is described next.

First Embodiment

Figure 5:
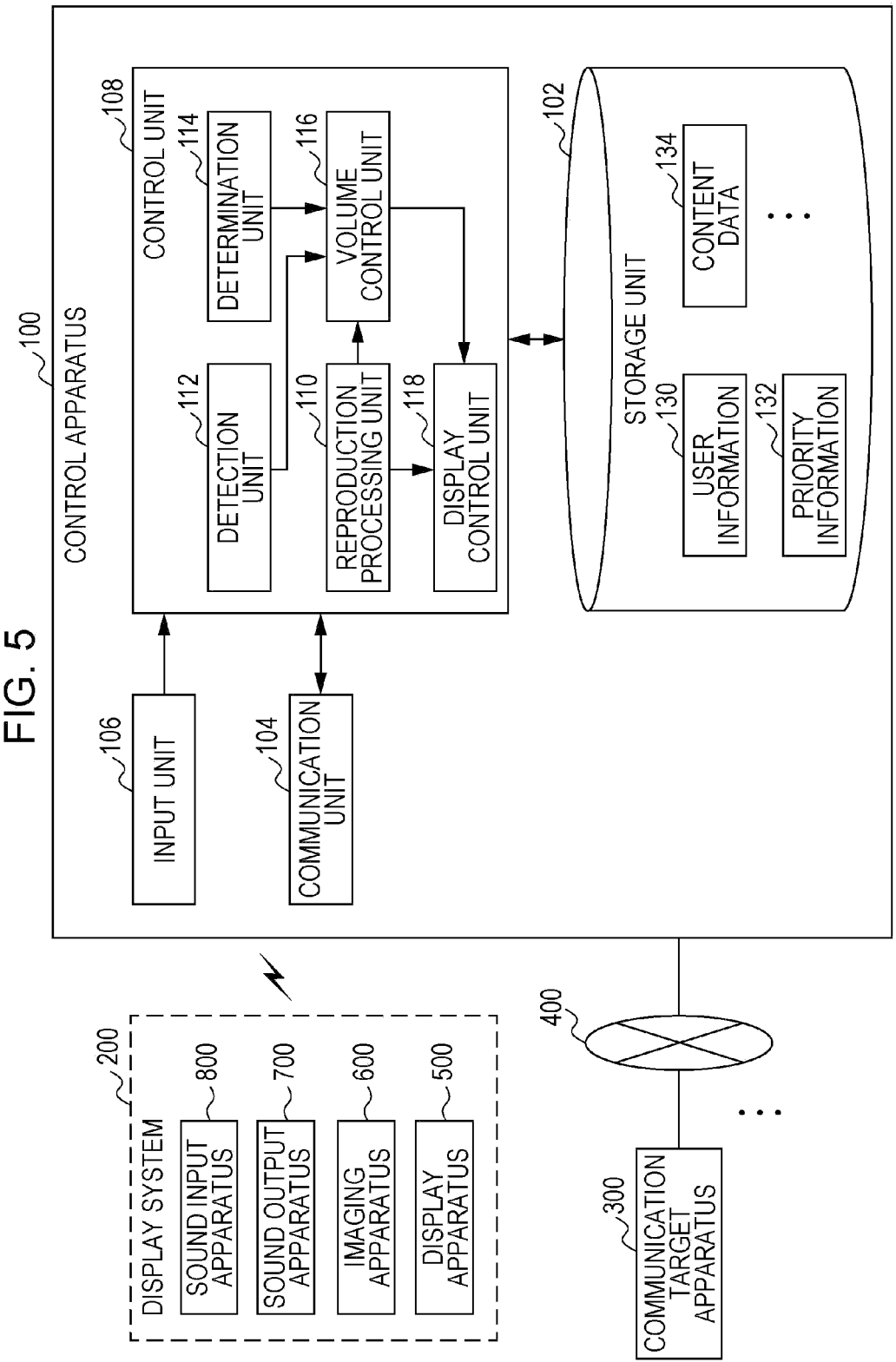
FIG. 5 is a block diagram of an example of the configuration of a control apparatus according to a first embodiment of the present disclosure.

FIG. 5 is a block diagram of an example of the configuration of a control apparatus 100 according to a first embodiment of the present disclosure.

In FIG. 5, a display system 200 and a communication target apparatus 300 are shown together with the control apparatus 100. The display system 200 displays an image (a still image or a moving image) on a display screen, generates a captured image obtained by capturing an image in the display direction of the display screen, and inputs and outputs sound in order to realize caller-callee communication using voice. The communication target apparatus 300 is connected to the control apparatus 100 via a network 400. As used herein, connection using the network 400 means that one of the apparatuses is communicating with another apparatus via the network 400 or the apparatuses are in communicable state with each other. In addition, examples of the network 400 include a wired network, such as a local area network (LAN) or a wide area network (WAN), a wireless network, such as a wireless WAN (WWAN) via a base station, and the Internet using a communication protocol, such as TCP/IP (transmission control protocol/Internet Protocol). Note that communication between the control apparatus 100 and the communication target apparatus 300 is performed not only using the network 400 but, for example, using direct connection.

By using the configuration shown in FIG. 5, a user who uses the control apparatus 100 and the display system 200 can communicate with a user of the communication target apparatus 300 over, for example, a video call using a captured image and voice. Note that the display system 200 shown in FIG. 5 may be replaced with a sound input and output system (not shown) that includes, for example, a microphone and a speaker and that inputs and outputs sound in order to realize caller-callee communication using voice. In such a case, a user who uses the control apparatus 100 and the sound input and output system (not shown) communicates with the user of the communication target apparatus 300 through voice call.

In addition, FIG. 5 illustrates an example of the display system 200 including a display apparatus 500 that performs a display operation, an imaging apparatus 600 that performs an image capturing operation, a sound output apparatus 700 that outputs sound, and a sound input apparatus 800 that receives sound. However, the configuration of the display system 200 according to the embodiment of the present disclosure is not limited to the above-described configuration. For example, the display system 200 may be an apparatus into which the display apparatus 500, the imaging apparatus 600, and the sound output apparatus 700 are integrated (e.g., a display apparatus having an imaging function and a sound output function). Alternatively, the display system 200 may be a single unit having, for example, a display function, an imaging function, a sound output function, and a sound input function.

In this configuration, by generating a captured image obtained by capturing an image in a display direction of the display screen using the display system 200, an image of a user watching the display screen can be captured. Accordingly, by processing a captured image generated by the display system 200, the control apparatus 100 can easily perform, for example, a face recognition process in order to identify the priority assigned to the user corresponding to the speech sound.

As shown in FIG. 5, the control apparatus 100 includes a storage unit 102, a communication unit 104, an input unit 106, and a control unit 108.

The control apparatus 100 can further include, for example, a read only memory (ROM) (not shown), a random access memory (RAM) (not shown), and an operation unit operable by a user (not shown). The control apparatus 100 connects such components with one another via a bus that functions as a data transmission path.

The ROM (not shown) stores, for example, a program and control data, such as computation parameters, used by the control unit 108. The RAM (not shown) temporarily stores a program executed by the control unit 108, for example. An example of the operation unit (not shown) is a button, a directional key, or a combination thereof. Note that the control apparatus 100 may be connected to an operation input device (e.g., a keyboard and a mouse) serving as an external unit of the control apparatus 100.

Example of Hardware Configuration of Control Apparatus

Figure 6:
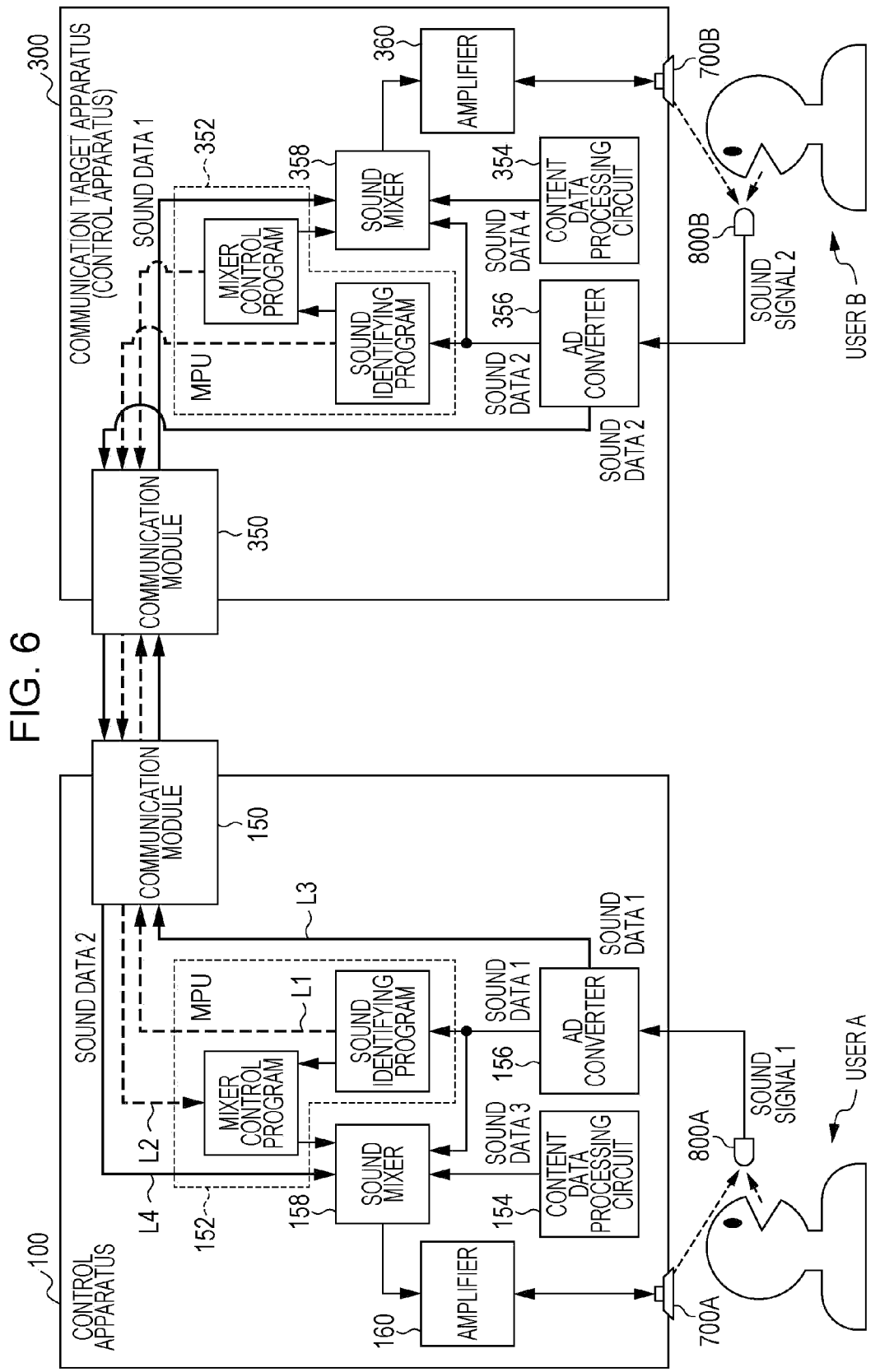
FIG. 6 illustrates an example of the hardware configuration of the control apparatus according to the embodiment of the present disclosure.

FIG. 6 illustrates an example of the hardware configuration of the control apparatus 100 according to the embodiment of the present disclosure. In FIG. 6, an example of part of the hardware configuration of the control apparatus 100 for caller-callee communication using voice is shown. In addition, the communication target apparatus 300 that has a similar configuration (i.e., another control apparatus 100 serving as a communication partner) is shown in FIG. 6. That is, the hardware configuration of the control apparatus 100 according to the embodiment of the present disclosure is not limited to that shown in FIG. 6. For example, the control apparatus 100 includes a recording medium (not shown) functioning as the storage unit 102 and an input and output interface (not shown) functioning as the input unit 106. In addition, in FIG. 6, an example of the control apparatus 100 that includes a sound output device 700A (corresponding to a sound output unit described below) serving as the sound output apparatus 700 and formed from a speaker is shown.

A recording medium (not shown) is provided as a storage unit of the control apparatus 100. The recording medium stores, for example, user information, priority information, content data, and an application. Examples of the recording medium include a magnetic recording medium, such as a hard disk, and a nonvolatile memory, such as an electrically erasable and programmable read only memory (EEPROM), a flash memory, a magnetoresistive random access memory (MRAM), a ferroelectric random access memory (FeRAM), or a phase change random access memory (PRAM). In addition, the control apparatus 100 can include a recording medium removable from the control apparatus 100 (not shown).

Examples of the input and output interface (not shown) include a sound input terminal, a sound output terminal, a universal serial bus (USB) terminal, a digital visual interface (DVI) terminal, a high-definition multimedia interface (HDMI) terminal, and a variety of processing circuits.

As shown in FIG. 6, the control apparatus 100 includes, for example, a communication module 150, an MPU 152, a content data processing circuit 154, an analog-to-digital (AD) converter 156, a sound mixer 158, and an amplifier 160. The communication target apparatus 300 includes, for example, a communication module 350, an MPU 352, a content data processing circuit 354, an AD converter 356, a sound mixer 358, and an amplifier 360. Since the components of the communication target apparatus 300 can have configurations that are the same as those of the corresponding components of the control apparatus 100 described below, description of the communication target apparatus 300 is not provided below.

The communication module 150 is provided as a communication unit of the control apparatus 100. The communication unit 150 serves as a communication unit 104 that communicates with an external apparatus, such as the display system 200, the communication target apparatus 300, or a server (not shown), via the network 400 (or directly) wired or wirelessly. Examples of a communication interface (not shown) includes a communication antenna and an RF circuit, an IEEE 802.15.1 port and a transmitting and receiving circuit, an IEEE 802.11b port and a transmitting and receiving circuit, and a LAN terminal and a transmitting and receiving circuit.

Note that the control apparatus 100 can communicate a sound signal and an image signal with the display system 200 using, for example, the communication module 150 and/or an input and output interface (not shown). Accordingly, in the control apparatus 100 according to the embodiment of the present disclosure, the communication module 150 may function as the communication unit 104 and the input unit 106. In addition, in FIG. 6, the control apparatus 100 includes only one communication module 150. However, the configuration of the control apparatus 100 according to the embodiment of the present disclosure is not limited thereto. For example, the control apparatus 100 may include a plurality of communication modules, one of the communication modules may function as the communication unit 104, and the other communication modules may function as the input unit 106.

The MPU 152 is formed from an integrated circuit including a micro processing unit (MPU) and a plurality of circuits for realizing a variety of functions, such as a voice print authentication process, a face recognition process, and image processing. The MPU 152 functions as a control unit 152 that performs overall control of the control apparatus 100. In addition, in the control apparatus 100, the MPU 152 serves as, for example, a reproduction processing unit 110, a detection unit 112, a determination unit 114, a volume control unit 116, and a display control unit 118. Note that while, in FIG. 5, the control apparatus 100 includes the content data processing circuit 154 and the sound mixer 158 separately from the MPU 152, the configuration of the control apparatus 100 is not limited to such a configuration. For example, in the control apparatus 100 according to the embodiment of the present disclosure, the MPU 152 may have the function of the content data processing circuit 154 and the function of the sound mixer 158.

For example, the MPU 152 executes a sound identifying program using voice print recognition and processes sound data 1 transmitted from the AD converter 156. Thus, the MPU 152 identifies a user corresponding to the speech sound included in the sound data 1 (a user A in the example shown in FIG. 6). Thereafter, the MPU 152 transmits user information regarding the identified user to the communication target apparatus 300 via the communication module 150 (refer to a signal line L1)

In addition, for example, the MPU 152 executes a mixer control program that performs the volume control process on a priority basis. Thus, the MPU 152 controls the sound mixer 158 using the transmitted user information, user information transmitted from the communication target apparatus 300 via the communication module 150 (refer to a signal line L2), and the priority of the content data being reproduced.

The content data processing circuit 154 performs a process regarding reproduction of content data. An example of the content data processing circuit 154 is an integrated circuit into which a variety of circuits, such as an encoder and a decoder, are integrated. The content data processing circuit 154 reproduces sound data 3 representing content sound and transmits the sound data 3 to the sound mixer 158.

The AD converter 156 converts the sound signal 1 received from a sound input apparatus 800A into the sound data 1. The sound data 1 can include, for example, the speech sound of the user A and/or sound output from the sound output device 700A. Thereafter, the AD converter 156 transmits the sound data 1 to the communication module 150 (refer to a signal line L3). Thus, the sound data 1 is transmitted to the communication target apparatus 300. In addition, the AD converter 156 transmits the sound data 1 to the MPU 152 and the sound mixer 158.

Under the control of the MPU 152, the sound mixer 158 controls the volumes of the sound data 1, the sound data 2 that includes speech sound and transmitted from the communication target apparatus 300 via the communication module 150 (refer to a signal line L4), and the sound data 3 representing the content sound.

The sound data controlled by the sound mixer 158 is converted into a sound signal and is amplified by the amplifier 160. Thereafter, the sound signal is transmitted to the sound output device 700A. Accordingly, the content sound and speech sound having the volumes controlled through the volume control process on a priority basis are output from the sound output device 700A.

The control apparatus 100 has, for example, the configuration shown in FIG. 6 and realizes the process according to the convenience improvement approach. However, it should be noted that the configuration of the control apparatus 100 according to an embodiment of the present disclosure is not limited to the configuration shown in FIG. 6.

Referring back to FIG. 5, an example of the configuration of the control apparatus 100 according to the first embodiment of the present disclosure is described. The storage unit 102 is provided as a storage unit of the control apparatus 100. Examples of the storage unit 102 include a magnetic recording medium, such as a hard disk, and a nonvolatile memory, such as a flash memory.

The storage unit 102 stores, for example, user information, priority information, content data, and an application. In FIG. 5, as examples, user information 130, priority information 132, and content data 134 are stored in the storage unit 102.

The communication unit 104 is provided as a communication unit of the control apparatus 100. The communication unit 104 communicates with an external apparatus, such as the display system 200, the communication target apparatus 300, or a server (not shown), via the network 400 (or directly) wired or wirelessly. The control apparatus 100 communicates at least one communication target apparatus using the communication unit 104 and can perform caller-callee communication (caller-callee communication using voice or both a captured image and voice). In addition, the communication unit 104 performs communication under the control of the control unit 108.

Examples of the communication unit 104 include a communication antenna and an RF circuit, and a LAN terminal and a transmitting and receiving circuit. However, the communication unit 104 is not limited thereto. For example, the communication unit 104 can have any configuration that is communicable with an external apparatus via the network 400.

For example, the input unit 106 receives a captured image generated by the imaging apparatus 600 that captures an image and a sound signal generated by the sound input apparatus 800. Thereafter, the input unit 106 transmits the received (input) captured image and sound signal to the control unit 108. Examples of the input unit 106 include a sound input terminal, a sound output terminal, a USB terminal, a DVI terminal, an HDMI terminal, and a variety of processing circuits. However, the input unit 106 is not limited thereto. For example, the input unit 106 can have any configuration that can receive a captured image and a sound signal from an external apparatus wired or wirelessly.

In addition, upon receiving distance data generated by the sound input apparatus 800, the input unit 106 transmits the distance data to the control unit 108.

The control unit 108 is formed from an integrated circuit into which a variety of processing circuits, such as an MPU, a content data processing circuit, and a sound mixer, are integrated. The control unit 108 performs overall control of the control apparatus 100. Furthermore, the control unit 108 includes a reproduction processing unit 110, a detection unit 112, a determination unit 114, a volume control unit 116, and a display control unit 118. Thus, the control unit 108 plays a major role in the process according to the convenience improvement approach according to the embodiment of the present disclosure.

The reproduction processing unit 110 reproduces content data stored in the storage unit 102 or content data transmitted from an external apparatus, such as the communication target apparatus 300 or a server (not shown), and received by the communication unit 104.

The detection unit 112 detects speech sound of a user in caller-callee communication on the basis of the sound signal transmitted from the input unit 106 and the external sound signal received by the communication unit 104.

The determination unit 114 determines whether volume control is performed. More specifically, the determination unit 114 performs the process in step S104 shown in FIG. 1 on the basis of, for example, the state of a hardware switch or a software switch that determines on/off of volume control, a captured image, and distance information.

Note that in FIG. 5, the control apparatus 100 includes the determination unit 114. However, according to the embodiment of the present disclosure, the configuration of the control apparatus 100 is not limited thereto. For example, the control apparatus 100 can have a configuration that does not include the determination unit 114. In such a case, the control apparatus 100 performs the process according to the convenience improvement approach according to the embodiment of the present disclosure when it is determined that volume control is to be performed in step S104 shown in FIG. 1.

The volume control unit 116 plays a major role in the volume control process performed on a priority basis. More specifically, the volume control unit 116 performs, for example, a process shown in FIG. 2 on the basis of priorities assigned to the content data being reproduced by the reproduction processing unit and a user corresponding to the speech sound detected by the detection unit. Thereafter, the volume control unit 116 transmits a sound signal corresponding to a sound having a controlled volume to the sound output apparatus 700 via the communication unit 104. Subsequently, the sound output apparatus 700 outputs the sound having the controlled volume.

In addition, when the volume control unit 116 controls the volume of content sound or the volume of the speech sound, the volume control unit 116 gradually increases or decreases the volume so that fade-in or fade-out is accomplished.

Furthermore, if the determination unit 114 determines that volume control is to be performed, the volume control unit 116 selectively controls the volume of the content sound and the volume of the speech sound. Since the volume control unit 116 controls the volume in accordance with the result of determination made by the determination unit 114, the control apparatus 100 can selectively enable or disable volume control on the basis of the state of a hardware switch or a software switch, a predetermined motion performed by a user, or a distance between the user and the sound input apparatus 800.

The display control unit 118 controls displaying of an image on a display screen. More specifically, if, for example, the reproduction processing unit 110 reproduces content data regarding the content including an image, the display control unit 118 causes the display apparatus 500 or a display unit (described below) included in the display control unit 118 to display the image. In addition, for example, when the control apparatus 100 performs caller-callee communication with the communication target apparatus 300 using a captured image and voice, the display control unit 118 displays the image represented by content data reproduced by the reproduction processing unit 110 and a captured image received from the communication target apparatus 300 by the communication unit 104 in a display screen at the same time. Alternatively, for example, when the control apparatus 100 performs caller-callee communication with the communication target apparatus 300 using a captured image and voice, the display control unit 118 may display a captured image received by the input unit 106 in the display screen in addition to the image represented by the content data. That is, the display control unit 118 displays a captured image used for caller-callee communication in the display screen together with, for example, an image represented by the content data.

In addition, when an image represented by content data and a captured image are displayed in a display screen at the same time, the display control unit 118, for example, changes a display ratio of the image represented by content data to the captured image used for caller-callee communication in conjunction with selective volume control of the volume of the content sound and the volume of the speech sound performed by the volume control unit 116.

According to the first embodiment of the present disclosure, the control apparatus 100 can realize the process according to the convenience improvement approach through the configuration shown in FIG. 5. Accordingly, by employing, for example, the configuration shown in FIG. 5, the control apparatus 100 can improve user convenience when caller-callee communication is performed with at least one communication target apparatuses. However, it should be noted that the configuration of the control apparatus 100 according to the first embodiment of the present disclosure is not limited thereto.

Second Embodiment

Figure 7:
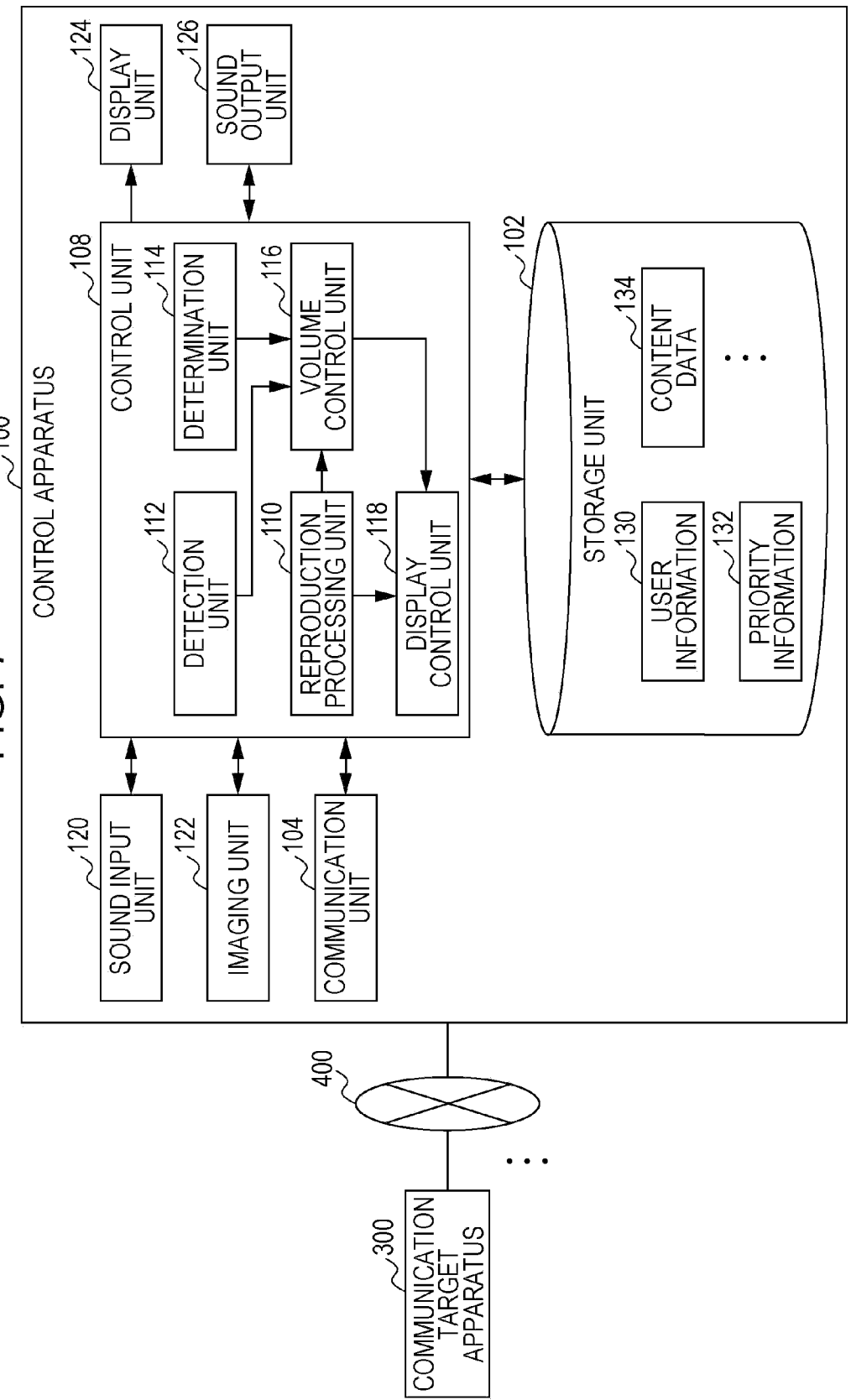
FIG. 7 is a block diagram of an example of the configuration of a control apparatus according to a second embodiment of the present disclosure.

FIG. 7 is a block diagram of an example of the configuration of a control apparatus 100 according to a second embodiment of the present disclosure. As in FIG. 5, in FIG. 7, a communication target apparatus 300 connected via the network 400 is also shown.

As shown in FIG. 7, according to the second embodiment of the present disclosure, the control apparatus 100 has a configuration that is basically similar to that of the control apparatus 100 according to the first embodiment shown in FIG. 5. However, unlike the control apparatus 100 according to the first embodiment shown in FIG. 5, the control apparatus 100 according to the second embodiment does not include the input unit 106 and further includes a sound input unit 120, an imaging unit 122, a display unit 124, and a sound output unit 126.

The sound input unit 120 is provided as a sound signal generating unit of the control apparatus 100. An example of the sound input unit 120 is a microphone. Note that the sound input unit 120 may be removable from the control apparatus 100.

In addition, the sound input unit 120 can include a distance sensor that measures the distance between the sound input unit 120 and a user. Thus, the sound input unit 120 can generate distance information. However, the configuration of the control apparatus 100 is not limited to the configuration in which the sound input unit 120 includes a distance sensor. For example, the sound input unit 120 may have a distance sensor functioning as a distance information generating unit (not shown) separately from the body of the sound input unit 120.

The imaging unit 122 is provided as an imaging unit of the control apparatus 100. The imaging unit 122 captures an image in the display direction of the display screen of the display unit 124 and generates a captured image. Note that if the control apparatus 100 according to the second embodiment of the present disclosure does not have a function of performing caller-callee communication using a captured image and voice, the control apparatus 100 may have a configuration that does not include the imaging unit 122.

An example of the imaging unit 122 is an imaging device including, for example, a pair including a lens and an image sensor and a signal processing apparatus. In the imaging device, an optical lens and an image sensor including a plurality of imaging elements, such as a charge coupled device (CCD) or a complementary metal oxide semiconductor (CMOS) are included. The signal processing circuit includes, for example, an automatic gain control (AGC) circuit and an AD converter. The signal processing circuit converts an analog signal generated by the image sensor into a digital signal (image data) and performs a variety of signal processes. Example of the signal processes performed by the signal processing circuit include, for example, a white balance correction process, an interpolation process, a color tone correction process, a gamma correction process, an YCbCr conversion process, an edge enhancement process, and a coding process.

The display unit 124 is provided as a display unit of the control apparatus 100. The display unit 124 displays various types of information and images. Examples of screens displayed on the display unit 124 include a content display screen displaying an image represented by content data, a screen displaying a captured image used for caller-callee communication, and an operation screen user for instructing the control apparatus 100 to perform a desired operation. Note that in the above-described screen in which a captured image used for caller-callee communication is displayed, the captured image and an image represented by content may be displayed in parallel or in an overlaid manner.

Examples of the display unit 124 include a liquid crystal display (LCD), an organic electroluminescence display, and an organic light emitting diode (OLED) display.

The sound output unit 126 is provided as a sound output unit of the control apparatus 100. The sound output unit 126 outputs a variety of sounds, such as content sound, speech sound for caller-callee communication, and system sounds of the control apparatus 100.

An example of the sound output unit 126 is a sound output device including a digital signal processor (DSP), an amplifier, and a speaker.

According to the second embodiment, the control apparatus 100 has a configuration basically similar to that of the control apparatus 100 according to the first embodiment shown in FIG. 5. Thus, like the control apparatus 100 according to the first embodiment, by employing the configuration shown in FIG. 7, the control apparatus 100 according to the second embodiment can realize the process according to the convenience improvement approach. Therefore, by employing, for example, the configuration shown in FIG. 7, the control apparatus 100 can improve the convenience of a user when caller-callee communication is performed with at least one communication target apparatuses. However, it should be noted that the configuration of the control apparatus 100 according to the second embodiment is not limited to the configuration shown in FIG. 7. For example, like the control apparatus 100 according to the first embodiment shown in FIG. 5, the control apparatus 100 according to the second embodiment may include the input unit 106.

As described above, the control apparatus 100 according to an embodiment of the present disclosure selectively control the volume of the content sound and the volume of the speech sound on the basis of a priority assigned to the content data being reproduced and/or a priority assigned to the user corresponding to the detected speech sound. Thus, by dynamically controlling the volumes in accordance with the set priorities, the control apparatus 100 can increase the volume of the content sound to a volume louder than the volume of the speech sound. Alternatively, the control apparatus 100 can increase the volume of the speech sound to a volume louder than the volume of the content sound.

In this way, the control apparatus 100 can control the volumes while reducing the probability of the occurrence of the above-described undesirable situation and, therefore, the control apparatus 100 can increase user convenience in caller-callee communication with a communication target apparatus.

While the embodiments of the present disclosure have been described with reference to the control apparatus 100, an embodiment of the present disclosure is not limited thereto. For example, the embodiment of the present disclosure is applicable to a variety of apparatuses, such a computer (e.g., a PC or a server), a display apparatus (e.g., a television receiver or a signage apparatus), a portable communication apparatus (e.g., a cell phone), a video/music playback apparatus (or a video/music recording and reproduction apparatus), a game console, and a set-top box.

While the embodiment of the present disclosure has been described with reference to the display system 200, an embodiment of the present disclosure is not limited thereto. For example, the embodiment of the present disclosure is applicable to a variety of apparatuses, such as a computer (e.g., a PC), a display apparatus (e.g., a television receiver or a signage apparatus), and a portable communication apparatus (e.g., a cell phone). Note that the display system 200 according to the embodiment of the present disclosure may be a combination of an apparatus for displaying an image, an apparatus for capturing an image, an apparatus for generating a sound signal, and an apparatus for outputting sound.

3. Program According to Embodiment of Present Disclosure

By using a program that causes a computer to function as the control apparatus according to the embodiment of the present disclosure (e.g., a program that realizes the process according to the convenience improvement approach according to the embodiment of the present disclosure shown in FIGS. 1, 2, and 4), the convenience of a user can be increased when caller-callee communication is performed with a communication target apparatus.

Although an exemplary embodiment of the present disclosure has been described with reference to the accompanying drawings, it should be appreciated that the present disclosure is not limited to such an exemplary embodiment. It is evident that many alternatives, modifications and variations will be apparent to those skilled in the art within the spirit and broad scope of the appended claims. That is, it is intended to embrace all such alternatives, modifications and variations that fall within the spirit and technical scope of the disclosure.

For example, the control apparatus 100 according to an embodiment of the present disclosure can separately include the reproduction processing unit 110, the detection unit 112, the determination unit 114, the volume control unit 116, and the display control unit 118 shown in FIGS. 5 and 7 (e.g., the control apparatus 100 can be formed from independent processing circuits).

In addition, while the above description has been made with reference to a provided program (a computer-readable program) that causes a computer to function as the control apparatus according to an embodiment of the present disclosure, an embodiment of the present disclosure can also provide a recording medium, such as a non-transitory recording medium, having the above-described program recorded thereon.

The above-described configuration is only an example of the embodiment of the present disclosure and, therefore, is embraced within the technical scope of the present disclosure.

What is claimed is:

1. An apparatus comprising:
    a circuit that:
        controls a first volume of a first content sound and a second volume of a second content sound according to respective first and second priorities set, wherein at least one priority of the first priority or the second priority is in a form of metadata,
        wherein volume of sound of the first and second content sounds having a higher priority is greater than volume of sound of the first and second content sounds having a lower priority,
        wherein the at least one priority is a step-wise value of a plurality of step-wise values representing respectively different levels of priority, in which the metadata indicates, for each respective phrase of phrases forming content sound to which the at least one priority corresponds, one of the plurality of step-wise values, and
        wherein the circuit controls the first and second volumes by dynamically determining, for each phrase forming the content sound, the higher priority of the first and second content sounds, using the step-wise value corresponding to the phrase indicated by the metadata for the at least one priority.

2. The apparatus of claim 1, wherein the first and second volumes are controlled based on the first and second priorities only when the first volume and the second volume are determined to be output by the apparatus.

3. The apparatus of claim 1, wherein, when the volume of sound having a higher priority is increased, the volume of sound having a lower priority is decreased.

4. The apparatus of claim 1, wherein the first volume is controlled in synchronization with the second volume.

5. A method comprising:
    controlling, by a circuit or a processor, a first volume of a first content sound and a second volume of a second content sound according to respective first and second priorities, wherein at least one priority of the first priority or the second priority is in a form of metadata,
    wherein volume of sound of the first and second content sounds having a higher priority is greater than the volume of sound of the first and second content sounds having a lower priority, and
    wherein the at least one priority is a step-wise value of a plurality of step-wise values representing respectively different levels of priority, in which the metadata indicates, for each respective phrase of phrases forming content sound to which the at least one priority corresponds, one of the plurality of step-wise values; and
    controlling, by the circuit or the processor, the first and second volumes by dynamically determining, for each phrase forming the content sound, the higher priority of the first and second content sounds, using the step-wise value corresponding to the phrase indicated by the metadata for the at least one priority.

* * * * *